(12) United States Patent
Suhara et al.

(10) Patent No.: US 6,728,095 B2
(45) Date of Patent: Apr. 27, 2004

(54) ELECTRIC DOUBLE LAYER CAPACITOR

(75) Inventors: Manabu Suhara, Yokohama (JP); Kazuya Hiratsuka, Yokohama (JP); Katsuji Ikeda, Yokohama (JP); Takeshi Kawasato, Yokohama (JP); Yoshiaki Higuchi, Yokohama (JP); Takamichi Ishikawa, Kawasaki (JP); Satoru Kuroki, Kawasaki (JP); Sadao Kanetoku, Kawasaki (JP); Naoki Yoshida, Yokohama (JP); Naruaki Tomita, Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 10/024,377

(22) Filed: Dec. 21, 2001

(65) Prior Publication Data

US 2002/0080557 A1 Jun. 27, 2002

Related U.S. Application Data

(60) Division of application No. 09/253,704, filed on Feb. 22, 1999, and a continuation-in-part of application No. 09/241,287, filed on Feb. 1, 1999, now Pat. No. 6,104,600, and a continuation-in-part of application No. 09/238,886, filed on Jan. 28, 1999, now Pat. No. 6,264,707, and a continuation-in-part of application No. 09/212,405, filed on Dec. 16, 1998, now Pat. No. 6,383,427, and a continuation-in-part of application No. 09/170,278, filed on Oct. 13, 1998, now Pat. No. 6,195,251.

(30) Foreign Application Priority Data

| Oct. 29, 1997 | (JP) | ............................................ 09-297516 |
| Dec. 24, 1997 | (JP) | ............................................ 09-355589 |
| Jan. 30, 1998 | (JP) | ............................................ 10-019758 |
| Feb. 2, 1998 | (JP) | ............................................ 10-021209 |
| Feb. 20, 1998 | (JP) | ............................................ 10-039310 |
| Mar. 31, 1998 | (JP) | ............................................ 10-087048 |

(51) Int. Cl.[7] ............................ H01G 9/155; H01G 9/00
(52) U.S. Cl. ........................................ 361/502; 361/503
(58) Field of Search ................................. 361/502–517

(56) References Cited

U.S. PATENT DOCUMENTS 3,652,902 A * 3/1972 Hart et al. .................. 361/502

(List continued on next page.)

FOREIGN PATENT DOCUMENTS

DE           195 48 005           7/1996

(List continued on next page.)

OTHER PUBLICATIONS

Hang Shi, Electrochimica Acta, vol. 41, No. 10, pp. 1633–1639, XP–004019391, "Activated Carbons and Double Layer Capacitance", Jun. 1, 1996.

(List continued on next page.)

*Primary Examiner*—Dean A. Reichard
*Assistant Examiner*—Eric Thomas
(74) *Attorney, Agent, or Firm*—Oblon, Spivak, McClelland, Maier & Neustadt, P.C.

(57) ABSTRACT

An electric double layer capacitor including a positive electrode assembly and a negative electrode assembly, each electrode assembly having a porous layer including a carbonaceous powder and a fluorine-containing polymer formed on at least one side of an aluminum foil current collector, the positive electrode and the negative electrode being disposed so that the porous layer of the positive electrode assembly and the porous layer of the negative electrode assembly face each other with a separator interposed therebetween to form an element, the element being impregnated with a non-aqueous electrolyte and accommodated in a sealed container, wherein the thickness of the porous layer is from 80 to 200 $\mu$m, the thickness of the aluminum foil current collector is from 20 to 80 $\mu$m, the thickness of the separator is from 30 to 170 $\mu$m, and the density of the porous layer is from 0.50 to 0.80 g/cm$^3$, wherein the capacitor has such a structure that a plurality of the positive electrode assemblies and the negative electrode assemblies are alternately laminated with a separator interposed therebetween, or strip positive electrode assemblies and negative electrode assemblies are wound with a separator interposed therebetween.

20 Claims, 2 Drawing Sheets

U.S. PATENT DOCUMENTS

| | | | |
|---|---|---|---|
| 4,194,040 A | | 3/1980 | Breton et al. |
| 4,422,992 A | | 12/1983 | Michel |
| 4,737,889 A | | 4/1988 | Nishino et al. |
| 4,862,328 A | | 8/1989 | Morimoto et al. |
| 5,157,586 A | | 10/1992 | Lallemand |
| 5,248,428 A | | 9/1993 | Hagen et al. |
| 5,450,279 A | * | 9/1995 | Yoshida et al. ............ 361/502 |
| 5,555,155 A | | 9/1996 | Patel et al. |
| 5,682,288 A | | 10/1997 | Wani |
| 5,753,358 A | | 5/1998 | Korleski |
| 5,777,428 A | * | 7/1998 | Farahmandi et al. ........ 313/352 |
| 5,953,204 A | | 9/1999 | Suhara et al. |
| 6,104,600 A | | 8/2000 | Suhara et al. |
| 6,195,291 B1 | | 2/2001 | Dallabora et al. |
| 6,264,707 B1 | | 7/2001 | Ishikawa et al. |
| 6,335,857 B1 | | 1/2002 | Takimoto et al. |
| 6,349,027 B1 | | 2/2002 | Suhara et al. |

FOREIGN PATENT DOCUMENTS

| | | |
|---|---|---|
| EP | 0 731 477 A3 | 9/1996 |
| EP | 0 917 166 | 5/1999 |
| EP | 0 933 791 | 8/1999 |
| JP | 1-221440 | 9/1989 |
| JP | 01230216 A | 3/1992 |
| JP | 404074405 A | 3/1992 |
| JP | 10-39310 | 2/1998 |
| JP | 11-40372 | 2/1999 |

OTHER PUBLICATIONS

Database WPI Section Ch, Week 9315, Derwent Publications Ltd., London, GB; An 93–124569 XP002101653 & SU 1 729 773 A (Nitrogen Ind Org Synthesis Prod Res), Apr. 30, 1992 (Abstract).

U.S. patent application Ser. No. 09/961,289, filed Sep. 25, 2001, pending.

U.S. patent application Ser. No. 09/987,299, filed Nov. 14, 2001, pending.

U.S. patent application Ser. No. 09/874,240, filed Jun. 6, 2001, pending.

U.S. patent application Ser. No. 09/212,405, filed Dec. 16, 1998, allowed.

* cited by examiner

ELECTRIC DOUBLE LAYER CAPACITOR

This application is a divisional application of U.S. patent application Ser. No. 09/253,704, filed Feb. 22, 1999, and a continuation in part of U.S. patent applications Ser. Nos. 09/170,278 (now U.S. Pat. No. 6,195,291), 09/212,405 (now U.S. Pat. No. 6,383,427), 09/238,886 (now U.S. Pat. No. 6,264,707), 09/241,287 (now U.S. Pat. No. 6,104,600), filed Oct. 13, 1998, Dec. 16, 1998, Jan. 28, 1999 and Feb. 1, 1999 respectively and incorporated entirely herein by reference.

BACKGROUND OF THE INVENTION

1. Field of the Invention

The present invention relates to an electric double layer capacitor, particularly an electric double layer capacitor suitable for an application which requires a high output.

2. Discussion of Background

The electric double layer capacitor is based on a principle to store electric charge in an electric double layer formed at the interface between a polarizable electrode and an electrolyte. It is possible to carry out quick charging and discharging with a larger current as compared with a cell, and application to the field of energy has been actively studied in recent years. For example, a capacitor which provides a large capacitance and a high output has been proposed in JP-A-8-45793. As a specific application, an attention has been drawn to the application to a electric car or a hybrid car. For such an application, it is required to develop a power source operating at a high output density of 500 W/kg in near future, and 1500 W/kg ultimately, as target values set by the Department of Energy, U.S.A. (A. F. Burke et. al., Material Characteristics and the Performance of Electrochemical Capacitors for Electric/hybrid Vehicle Applications, Materials Research Society Spring Meeting, San Francisco, Calif., 1995.4.17–21).

The specific gravity of an electric double layer capacitor cell may depend upon the structure or the housing. However, when an unnecessary space is removed and the housing is made light, it is usually from about 1.4 to about 1.8 g/cm$^3$. Accordingly, by calculating the output density as the output per volume, 500 W/kg, 1000 W/kg and 1500 W/kg correspond to about 800 W/L, about 1600 W/L and about 2400 W/L, respectively. Heretofore, many reports have been made about the initial performance of an electric double layer capacitor capable of being used at such a high output density. However, for an application to an electric car or the like, charging and discharging cycle reliability such as durability against 50,000 cycles of charging and discharging at large current is required, and an electric double layer capacitor having not only a high output density but also such a high reliability has not yet been obtained.

As an electrolyte for an electric double layer capacitor, an organic electrolyte and an aqueous electrolyte are available. However, an attention has been drawn to an electric double layer capacitor employing an organic electrolyte, as the operating voltage is high, and the energy density in the charged state can be made high. In the case where an organic electrolyte is employed, in order to improve the capacitance per unit area of an electric double layer capacitor (hereinafter referred to as capacitance density), a carbon material such as activated carbon is used. If water is present in the cell of an electric double layer capacitor, the performance tends to deteriorate due to electrolysis of the water. Accordingly, the electrode is generally subjected to heat treatment under reduced pressure to sufficiently remove water.

As a method of preparing the electrode, a method may, for example, be mentioned, wherein a carbon fine powder is dispersed in a solution having a binder such as carboxymethylcellulose dissolved in a solvent, to form a slurry, which is then coated on a current collector, followed by drying to form an electrode layer on the current collector. However, with this method, the bonding strength between the electrode and the current corrector is weak. Further, since heat resistance of the binder is not adequate, the heat treatment can not be applied to the electrode at such a high temperature that the impurities in the electrode such as water can be adequately removed. Further, with this method, for example, in a case where the electrode is made a thick film of at least 60 μm, it is difficult to uniformly remove the solvent from the slurry by drying, and it is difficult to form an electrode layer which provides a high strength, a low resistance, a high density and a high capacitance on the current collector with high productivity.

Further, a method has been proposed, which comprises preliminarily molding a kneaded material comprising a carbonaceous material such as activated carbon, a binder such as polytetrafluoroethylene (hereinafter referred to as PTFE) and a liquid lubricant, and forming it into a sheet by stretching or rolling to obtain an electrode (JP-A-63-107011, JP-A-2-235320). According to the method, as PTFE is formed into fibers, the ion conduction is not likely to be inhibited, and the carbonaceous material is filled highly densely. With regard to the bonding of the electrode and the current collector, by bonding them by means of an electroconductive adhesive layer, the bonding strength can be made high and the electrical contact resistance can be made small. Further, as PTFE is thermally and electrochemically stable, an electric double layer capacitor which provides high reliability, a high capacitance and a low resistance, can be constituted.

However, in an application wherein it is required to carry out charging and discharging with a large current, it is necessary to further decrease the resistance of the electrode, and it is effective to make the electrode thin. However, in the above electrode, PTFE is randomly formed into fibers by kneading, and a part of PTFE is formed into fibers and the rest is not. Therefore, when forming the electrode into a sheet having, for example, a thickness of at most 200 μm, the surface tends to be irregular, and holes are likely to be formed. Therefore, the capacitance density of the electric double layer capacitor can not be made large, and the internal resistance can not be sufficiently decreased.

SUMMARY OF THE INVENTION

To solve such problems, the present inventors have proposed a method which comprises extruding a mixture comprising a carbonaceous material, PTFE and a processing aid by screw extrusion, followed by rolling, to obtain a porous electrode sheet having a high strength and a thickness of at most 200 μm (JP-10-19758). According to the method, an electrode sheet can be continuously obtained industrially with high productivity.

The present inventors have established a technique to easily control the thickness of the electrode sheet of high strength by the above-mentioned method for producing an electrode. It is an object of the present invention to provide an electric double layer capacitor for power source, particularly an electric double layer capacitor source, particularly an electric double layer capacitor which provides a high output density and a high energy density and which is excellent in charging and discharging cycle durability, by utilizing the technique. The present invention provides an electric double layer capacitor comprising a positive electrode assembly and a negative electrode assembly, each electrode assembly having a porous layer comprising a carbonaceous powder and a fluorine-containing polymer formed on at least one side of an aluminum foil current collector, the positive electrode assembly and the negative electrode assembly being disposed so that the porous layer of the positive electrode assembly and the porous layer of the negative electrode assembly face each other with a separator interposed therebetween to form an element, the element being impregnated with a non-aqueous electrolyte and accommodated in a sealed container, wherein the thickness of the porous layer is from 80 to 200 μm, the thickness of the aluminum foil current collector is from 20 to 80 μm, the thickness of the separator is from 30 to 170 μm, and the density of the porous layer is from 0.50 to 0.80 g/cm$^3$.

DETAILED DESCRIPTION OF THE PREFERRED EMBODIMENTS

Figure 1:
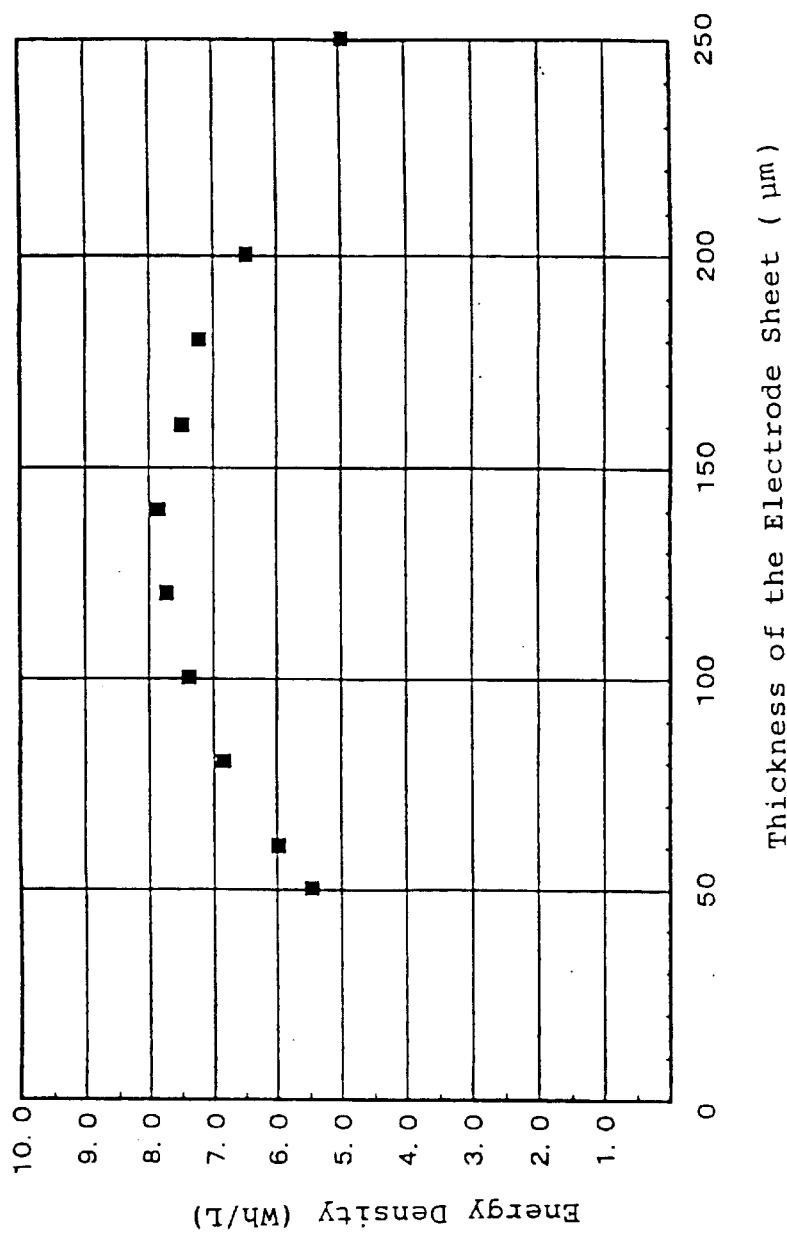
FIG. 1 is a diagram illustrating the relation between the thickness of the porous layer and the energy density in Working Examples and Comparative Examples of the present invention.

In the present specification, an assembly having an electrode layer made of a porous layer comprising a carbonaceous powder and a fluorine-containing polymer formed on one side or both sides of an aluminum foil collector, is referred to as an electrode assembly. When the electrode assembly is used on a positive electrode side, it will be referred to as a positive electrode side, it will be referred to as a positive electrode assembly, and when used on a negative electrode side, it will be referred to as a negative electrode assembly.

With regard to the porous layer in the present invention, the specific surface area of the carbonaceous powder is preferably from 700 to 2500 m$^2$/g, and the main component is preferably an activated carbon powder. If the specific surface area of the carbonaceous powder is less than 700 m$^2$/g, the capacitance of the electric double layer capacitor tends to decrease. If it exceeds 2500 m$^2$/g, it tends to be difficult to form the electrode with high density. Consequently, the capacitance per unit volume of the electrode becomes low. It is particularly preferably from 1000 to 1800 m$^2$/g. Further, besides an activated carbon powder, a material having a large specific surface area such as carbon black or polyacene may be preferably used. Particularly, it is preferred to mix an activated carbon powder having a high specific surface area and carbon black being highly electroconductive as an electroconductive material. In this case, it is preferred that carbon black is contained in the electrode layer in an amount of from 5 to 20 wt %.

The current collector to electrically connect the porous layer, may be any material which is excellent in electroconductivity and has electrochemical durability, and a valve metal such as aluminum, titanium or tantalum, a stainless steel or the like may be used. Among these, aluminum is preferred since it has a small specific gravity, it is excellent in electroconductivity and is electrochemically stable.

As the shape of the current collector, a foil is preferred since it is cheap. In a case where it is required to strengthen the bonding with continuous fine porous layer, a punching metal or an expanded metal may be optionally used. Further, it is possible to apply a treatment such as etching to the current collector foil to make the surface rough.

In the present invention, the thickness of the porous layer to be bonded to one side of the aluminum foil current collector is from 80 to 200 μm. If it is less than 80 μm, the content of the carbonaceous powder per unit volume of the electric double layer capacitor element tends to be small, thereby the capacitance density tends to be small. On the other hand, if it exceeds 200 μm, the resistance of the porous layer tends to be high, thereby the loss by high output charging and discharging increases and the energy density becomes low. The thickness of the porous layer is particularly preferably from 100 to 180 μm.

In the present invention, the thickness of the aluminum foil current collector is from 20 to 80 μm. If it is less than 20 μm, the strength of the current collector tends to be low, and the strength of the electrode assembly tends to be low, whereby the yield in the production of the electric double layer capacitor tends to be low, or operation failure is likely to result due to stress such as extraneous vibration during the use of the electric double layer capacitor. If the thickness of the aluminum foil current collector exceeds 80 μm, the content of the aluminum foil current collector per unit volume of the electric double layer capacitor element tends to increase, and the content of the carbonaceous powder relatively decreases, whereby the capacitance density becomes low, the output density becomes low or the energy density becomes low. The thickness of the aluminum foil current collector is preferably from 30 to 60 μm.

In the present invention, the thickness of separator is from 30 to 170 μm. If it is less than 30 μm, pinholes are likely to exist in the separator, thus leading to microshort-circuiting between electrodes, whereby the leakage current increases and a voltage-holding property decreases. If the thickness of the separator exceeds 170 μm, the voltage-holding property is likely to be secured. However, the content of the separator per unit volume of the electric double layer capacitor element increases, and the content of the carbonaceous powder relatively decreases, thereby the capacitance density becomes low, the output density becomes low or the energy density becomes low. Accordingly, it is preferred to select the material and the thickness of the separator depending upon the voltage-holding property, in addition to the output density and the energy density for a capacitor.

For example, the electric double layer capacitor of the present invention is used as combined power source with a solar cell, whereby charging and discharging cycles are carried out everyday, the separator is preferably a sheet having a thickness of from 30 to 80 μm, and the material is preferably a synthetic resin such as a porous polypropylene or cellulose. A cellulose sheet is particularly preferred since it is strong and cheap. A rayon paper is particularly preferred since it has a low resistance and a high strength. Further, it is preferred that two or more of the sheets having a thickness of from 20 to 40 μm are used, for example, to form a separator having a thickness of from 40 to 80 μm comprising a plurality of sheets overlaid one on another, since the leakage current can be effectively decreased.

Further, for an application wherein long-term storage of from several days to more than one month is required, the voltage-holding property has to be particularly high. Therefore, it is preferred that the separator is a sheet having a thickness of from 60 to 170 μm and made of glass fiber, cellulose or porous polypropylene. Among these, a glass fiber mat is preferred as it is excellent in heat resistance, oxidation resistance and solvent resistance, whereby particularly the voltage-keeping property and large current charging and discharging cycle durability can be made high.

It is preferred that the glass fiber mat is made of a fiber having a maximum fiber diameter of at most 10 $\mu$m, as the strength can be made high. However, even the glass fiber mat is not sufficient in strength, and it is hardly formed into a thin film having, for example, a thickness of less than 140 $\mu$m. Accordingly, a fluororesin such as polyfluorovinylidene, which has heat resistance and is electrochemically stable, may be incorporated as a binder for glass fiber, in an amount of from 0.2 to 5 wt %. Further, as in the case of carrying out charging and discharging cycles everyday, it is preferred that two or more of the sheets having a thickness of from 20 to 80 $\mu$m are used to form, for example, a separator having a thickness of from 60 to 170 $\mu$m comprising a plurality of sheets overlaid one on another, since the leakage current can be efficiently reduced.

In the present invention, the density of the porous layer is from 0.50 to 0.80 g/cm$^3$. If the density is less than 0.50 g/cm$^3$, the capacitance of the electrode tends to be low. If it exceeds 0.80 g/cm$^3$, the electrolyte is less likely to be impregnated to the porous layer, or the resistance tends to increase. It is preferably from 0.60 to 0.70 g/cm$^3$.

In the present invention, the ratio of the fluorine-containing polymer in the porous layer is preferably from 5 to 20 wt %. And when the fluorine-containing polymer is contained in an amount of at least 5 wt %, a practical strength of the electrode sheet can be obtained. However, if it is contained too much, the resistance of the porous layer increases. Accordingly, it is preferably at most 20 wt %. It is more preferably from 7 to 15 wt %.

As the fluorine-containing polymer in the present invention, PTFE is preferred. PTFE is formed into fibers, thereby the porous layer which has low resistance and high strength, and continues fine pores can be obtained. Here, PTFE of the present invention includes not only a homopolymer of the tetrafluoroethylene but a copolymer obtained by adding at most 0.5 mol % of another monomer to tetrafluoroethylene, followed by copolymerization. When the polymer units based on another monomer is at most 0.5 mol %, the melt fluidity is not given to PTFE, and it is possible to form the copolymer into fibers to prepare an electrode sheet having a high strength and a low resistance, just like the homopolymer of tetrafluoroethylene.

As another monomer, hexafluoropropylene, chlorotrifluoroethylene, perfluoro(alkyl vinyl ether), trifluoroethylene or (perfluoroalkyl)ethylene may, for example, be mentioned.

It is preferred that the porous layer in the present invention is obtained by extruding a mixture comprising a carbonaceous powder, PTFE and a processing aid such as an organic solvent by screw extrusion, followed by rolling by rolling rolls to form it into a sheet. It is preferred to conduct the rolling by rolling rolls in the same direction as the extrusion direction of the screw extrusion, as PTFE is formed into fibers in both length and breadth direction to have a three-dimensional structure. The electrode sheet obtained by the above method has a high strength, as PTFE is adequately formed into fibers. For example, a sheet made of a thin porous layer having a thickness of about 70 $\mu$m, can be continuously produced industrially with a high speed. Further, it is possible to continuously bond the obtained sheet with the aluminum foil current collector.

With regard to the porous layer in the present invention, it is preferred that the fluorine-containing polymer is formed into fibers to have a three-dimensional network structure, and the carbonaceous powder is supported by the network structure and they are mutually bonded. The fibers of the fluorine-containing polymer are produced when the extraneous stress is applied to the fluorine-containing polymer, such as kneading or extruding the fluorine-containing polymer and the carbonaceous powder with the processing aid. The fibers are three-dimensionally expanding connecting the knots made of the fluorine-containing polymer.

The diameter of the fibers, the length of the fiber connecting two knots, density or the like depend on the forming conditions. In the present invention, it is preferred that the fibers comprising fibers having a diameter of at most 0.1 $\mu$m and a length of at least 2 $\mu$m, when observed by a scanning electron microscope (hereinafter referred to as SEM) with a magnifying power of 10,000. Further, it is preferred that at least 50%, particularly at least 80% of the total volume of the fibers is occupied by fibers having a diameter of from 0.01 to 0.05 $\mu$m and a length of from 3 to 20 $\mu$m. Further, it is preferred that the density of fibers is such that from 2 to 20 fibers exist per 10 $\mu$m width in a direction perpendicular to the longitudinal direction of the fiber.

The higher the density of the fibers is, the more the strength of the fibers improves. However, in a case where an adequate amount of the carbonaceous powder is contained in the porous layer so that the capacitance of the electric double layer capacitor can be made adequately large, it tends to be difficult to make the density of the fibers high. Similarly, in a case where an adequate amount of carbonaceous powder is contained in the porous layer, the fibers having a diameter of larger than 0.1 $\mu$m or a length of shorter than 2 $\mu$m are less likely to form. Further, if the majority of the fibers contained in the porous layer are fibers having a too small diameter or a too long length, the strength tends to be weak.

Figure 3:
FIG. 3 is a SEM picture of the porous layer surface of the present invention with a magnifying power of 10,000.
Figure 2:
FIG. 2 is a SEM picture of the porous layer surface of the present invention with a magnifying power of 3,000.

Examples of SEM pictures of the porous layer surface are shown in FIG. 2 and FIG. 3. FIG. 2 and FIG. 3 are pictures observed with a magnifying power of 3,000 and 10,000, respectively. Particles having a large diameter are activated carbon and particles having small diameter of at most 0.1 $\mu$m are carbon black as an electroconductive material. Fibrous material is PTFE.

In the present invention, it is preferred that the electrode sheet made of the porous layer is bonded to the aluminum current collector by means of an electroconductive adhesive. As the electroconductive adhesive, an adhesive made of an electroconductive material of carbon black or fine graphite and a thermosetting resin binder is preferred since it has a strong adhesion and heat stability. As the thermosetting resin binder, a polyamideimide resin is preferred since it is excellent in heat resistance and adhesion.

Electrochemical or thermal changes such as deterioration, peeling and swelling are less likely to be brought about to the electrode assembly obtained by using the electroconductive adhesive even under severe conditions. Accordingly, the electric double layer capacitor having the electrode assembly is excellent in a long-term voltage-application durability, charging and discharging cycle reliability and cold resistant cycle reliability.

In the present invention, the porosity of the separator is preferably from 60 to 95%. If the porosity is less than 60%, the electrolyte-absorbing and holding properties tend to be inadequate, thereby the resistance of the separator tends to be high. If the porosity exceeds 95%, mechanical strength of the separator tends to be inadequate, thereby breaks are likely to result when producing an electric double layer capacitor cell or internal short-circuiting is likely to result.

Particularly for a use as a power source, the porosity of the separator is preferably from 70 to 90%.

In the present invention, the resistance per unit area of the electrode assembly is preferably from 3 to 9 $\Omega \cdot cm^2$ and the resistance per unit area of the separator is preferably at most 2 $\Omega \cdot cm^2$ in a state where the electrode assembly is impregnated with the electrolyte. If the resistance per unite area of the electrode assembly exceeds a $\Omega \cdot cm^2$, the resistance of the electric double layer capacitor element tends to be high, thereby the capacitor having a high output density is less likely to be obtained. To make the resistance per unit area of the electrode assembly less than 3 $\Omega \cdot cm^2$, it is required to make the thickness of the porous layer extremely thin or to make the amount of the electroconductive material in the porous layer large. Consequently, the amount of the carbonaceous powder contained in electric double layer capacitor per unit area becomes small, the capacitance of the electric double layer capacitor element becomes low, and the energy density becomes low. Particularly, the resistance per unit area of the electrode assembly is preferably from 3.5 to 6 $\Omega \cdot cm^2$.

If the resistance per unit area of the separator exceeds 2 $\Omega \cdot cm^2$, the resistance of the electric double layer capacitor element becomes high, thereby an electric double layer capacitor having a high output density can not be obtained. In order to achieve such a resistance per unit area, it is important to select the best combination of e.g. material and structure of the separator, composition and structure of the electrode, and composition of the electrolyte.

The measuring method of the resistance per unit area of the electrode assembly and the separator in the present invention are as follows.

(1) The element 1 is formed by impregnating an electrolyte to a positive electrode assembly and the negative electrode assembly which are made of the same electrode assembly, disposed to face each other with a separator interposed therebetween, and the discharging resistance is measured.

(2) The element 2 is formed in the same manner as in the element 1, except that two sheets constituting the separator in the element 1 are used to form a separator comprising two sheets overlaid one on the other, and the discharging resistance is measured.

(3) The resistance of the electrode assembly and the resistance of the separator are calculated from (1) and (2), and each value of resistance per unit area is obtained.

Two kinds of elements are used above, and it is also possible to form an element wherein three sheets are used to form a separator comprising a plurality of sheets overlaid one on another, and calculate the value of resistance of the electrode assembly and the separator from resistance of at least three kinds of the elements.

The non-aqueous electrolyte to be used for the electric double layer capacitor in the present invention is not particularly limited, and an electrolyte having an ion-dissociative salt dissolved in a known organic solvent can be used. Among these, an organic electrolyte having dissolved in an organic solvent a salt comprising a quaternary onium cation represented by $R^1R^2R^3R^4R^+$ or $R^1R^2R^3R^4P^+$, wherein each of $R^1$, $R^2$, $R^3$, $R^4$ which are the same or different, is a $C_{1-6}$ alkyl group, and an anion such as $BF_4^-$, $PF_6^-$, $ClO_4^-$ or $CF_3SO_3^-$ is preferred.

As the organic solvent, a carbonate such as propylenecarbonate, butylenecarbonate, diethylcarbonate or ethylmethylcarbonate, a lactone such as γ-butyrolactone, sulfolane or acetonitrile may, for example, be preferably used. They may be used alone or as a mixed solvent of two or more of them. For a use as a power source, in order to make electroconductivity high and ion concentration high, a solution having from 1.0 to 2.0 mol/L of $(C_2H_5)_3(CH_3)NPF_6$ or from 1.0 to 2.0 mol/L of $(C_2H_5)_3(CH_3)NBF_4$ dissolved in propylene carbonate as the main solvent is particularly preferred.

The structure of the electric double layer capacitor of the present invention is not particularly limited. However, the cylindrical type prepared by winding a pair of strip electrode assembly having electrode layers on both sides of the current collector, with a separator interposed therebetween, impregnating the electrolyte to the element and accommodating to close the element in a bottomed cylindrical container, and an laminate type prepared by alternately laminating a plurality of rectangular electrode assemblies having electrode layers formed on both sides of the current collector as positive electrode assemblies and negative electrode assemblies with the separator interposed therebetween to form an element, impregnating the electrolyte to the element and accommodating to close the element in a bottomed cylindrical container, are particularly preferred, since a large capacitance can thereby be obtained.

Now, the present invention will be described in further detail with reference to Examples. However, it should be understood that the present invention is by no means restricted to such specific Examples.

EXAMPLE 1 (WORKING EXAMPLE)

Propylene glycol was added to a mixture comprising 80 wt % of a high purity activated carbon powder having a specific surface area of 1,500 $m^2/g$ and an average particle size of 10 μm, 10 wt % of carbon black and 10 wt % of PTFE powder (in the present Example, it means a tetrafluoroethylene homopolymer), followed by mixing. The mixture was extruded by using a monoaxial extruder by screw extrusion, followed by rolling by rolling rolls, and was dried by hot wind to remove propylene glycol, and an electrode sheet having a thickness of 120 μm and a density of 0.64 $g/cm^3$ was prepared. The surface of the electrode sheet was observed by SEM with a magnifying power of 10,000, and it was found that at least 80% of the total volume of the PTFE fibers was occupied by PTFE fibers having a length of from 5 to 15 μm and a diameter of from 0.03 to 0.05 μm, and about 10 fibers existed per 10 μm width. An electrode having an area of 4 cm×6 cm was cut from the electrode sheet.

The electrode was bonded to one side of a pure aluminum foil of a rectangular shape having a width of 4 cm, a length of 6 cm and a thickness of 50 μm, and having a lead terminal, by means of an electroconductive adhesive having a polyamideimide resin as a binder, followed by heat curing of the adhesive to obtain an electrode assembly. Two sheets of such electrode assemblies were prepared, and the electrode side of the electrode assemblies were faced each other. A cellulose fiber separator having a density of 0.40 g/cm³, a porosity of 74% and a thickness of 40 μm, was interposed between the electrode assemblies, which was then sandwiched between two glass plates having a thickness of 2 mm, to obtain an element. Total thickness of the two electrode assemblies and the separator was 0.39 mm.

As an electrolyte, a solution having 1.5 mol/l of $(C_2H_5)_3(CH_3)NBF_4$ dissolved in propylene carbonate was used. The element was subjected to vacuum heating for 3 hours at a temperature of 200° C., to remove impurities from the element, and then it was impregnated with the electrolyte under vacuum and then accommodated to be closed in a polypropylene rectangular bottomed cylindrical container, and an electric double layer capacitor was obtained. The volume of the element was measured, and then the direct current resistance and the capacitance were measured at a current density of 20 mA/cm², and the capacitance density and the resistance per unit area were calculated. The results are shown in Table 1. The resistance per unit area is the sum of the resistances of the two electrode assemblies and the resistance of the separator part. The sum of the resistances of the two sheets of electrode assemblies, and the resistance of one sheet of the separator part were obtained from the relation between the direct current resistance of the capacitor element having five sheets of the separators and the direct current resistance of the capacitor element having one sheet of the separator. The sum of the resistances of the two electrode assemblies is shown in Table 1.

The energy density at an output density of 1600 W/L was obtained in a case of the discharging starting voltage of 2.5 V and the discharging final voltage of 1.25 V. The results are shown in Table 1. The output density per volume and the energy density per volume were obtained based on the capacitor element volume, and the volume for the terminals or the housing was not taken into consideration.

In Table 1, the unit of the electrode thickness, the element volume, the element capacitance, the element resistance, the element resistance per area, the electrode assembly resistance per area, capacitance density or the energy density is μm, cc, F, Ω, Ω·cm², Ω·cm², F/cc or Wh/L, respectively.

EXAMPLES 2 to 6 (WORKING EXAMPLES) AND EXAMPLES 7 to 10 (COMPARATIVE EXAMPLES)

The electric double layer capacitor was prepared in the same manner as in Example 1 except that the forming conditions of the electrode sheet was changed and the thickness of the electrode sheet was changed as shown in Table 1, and the same evaluation as in Example 1 was conducted. The results are shown in Table 1 with Example 1.

Further, the relation between the thickness of the electrode sheets and the energy density (output density of 1,600 W/L) obtained from Examples 1 to 10, are shown in FIG. 1.

EXAMPLE 11 (WORKING EXAMPLE)

Electrode sheets having a thickness of 130 μm and a density of 0.67 g/cm³ were prepared in the same manner as in Example 1 except that a high purity activated carbon powder having a specific surface area of 1,800 m²/g and an average particle size of 10 μm was used. The electrode sheets were bonded to both sides of an aluminum foil current collector having a thickness of 40 μm by using an electroconductive adhesive having a polyamideimide resin as a binder, followed by heat curing of the electroconductive adhesive to obtain a sheet having the electrode sheets and the current collector integrated. 34 sheets of electrode assemblies having an effective electrode area of 6.3 cm×12.3 cm were obtained from the sheet. 17 sheets of the electrode assemblies as positive electrode assemblies and 17 sheets of the electrode assemblies as negative electrode assemblies were alternately laminated with a glass fiber mat separator (made of glass fibers having a maximum fiber diameter of at most 10 μm, having a thickness of 160 μm and a porosity of 92%) interposed therebetween to form an element.

The laminated element was accommodated in a bottomed rectangular aluminum container having a height of 15 cm, a width of 7 cm and a thickness of 2.2 cm, sealed by laser welding by using an aluminum upper lid equipped with a positive terminal and a negative terminal, and subjected to vacuum drying at a temperature of 200° C. for 5 hours keeping the inlet open, to remove impurities.

Then, a propylene carbonate solution having 1.5 mol/l of $(C_2H_5)_3(CH_3)NPF_6$ as an electrolyte was impregnated to the element under vacuum, and a safety valve was arranged to the inlet, to prepare a rectangular electric double layer capacitor having a width of 7 cm, a height of 15 cm, a thickness of 2.2 cm and a weight of 380 kg.

Of the obtained electric double layer capacitor, the initial service capacity was 1,400 F, and the internal resistance was 2.8 mΩ. The leakage current after charged with a voltage of 2.5V for 100 hours was 1 mA. The capacitor was charged with a voltage of 2.5V for 100 hours and then left in an open circuit at a temperature of 25° C., and left for 7 days, thereby the holding voltage of the capacitor was 2.3V. The output energy density at a constant output discharging of 500 W/kg with a discharging starting voltage of 2.5V and the discharging final voltage of 1.25V was 1.7 Wh/kg. The average current during discharging was 112 A.

Then, charging and discharging at a constant current of 50 A with a voltage of from 0 to 2.5V were repeated for 50,000 cycles in a constant temperature chamber of 45° C., and the service capacity and the internal resistance after the 50,000 cycles were measured, which were compared with the initial properties, and the long-term operation reliability of the electric double layer capacitor was evaluated in an accelerated manner. The capacitance after the cycle test was 1,370 F, the internal resistance after the test was 2.9 mΩ, and charging and discharging reliability with a large current was high.

From the sheet prepared in the same manner as mentioned above, except that the electrode sheet was bonded to only one side of the current corrector, two sheets of the electrode assemblies having an effective electrode area of 4 cm×6 cm were cut, and the separator(glass fiber mat) was sandwiched therebetween to prepare an electrode in the same manner as in Example 1. Further, the same operations as in Example 1 were carried out, except that the above-mentioned electrolyte was used as an electrolyte, to prepare an electric double layer capacitor. The direct current resistance of the electric double layer capacitor was measured in the same manner as in Example 1. The resistance of the separator part was 1.2 Ω·cm² and the resistance of two sheets of the electrode assemblies was 4.3 Ω·cm².

TABLE 1

|  | Electrode Thickness | Element Volume | Element Capacitance | Element Resistance | Element Resistance per Area | Electrode Assembly Resistance | Element Capacitance Density | Energy Density |
|---|---|---|---|---|---|---|---|---|
| Ex. 1 | 120 | 0.936 | 13.2 | 0.18 | 4.32 | 3.8 | 14.1 | 7.76 |
| Ex. 2 | 100 | 0.840 | 11.0 | 0.17 | 4.08 | 3.6 | 13.1 | 7.41 |
| Ex. 3 | 80 | 0.744 | 8.8 | 0.16 | 3.84 | 3.3 | 11.8 | 6.86 |
| Ex. 4 | 140 | 1.032 | 15.4 | 0.20 | 4.80 | 4.3 | 14.9 | 7.87 |
| Ex. 5 | 160 | 1.152 | 17.6 | 0.23 | 5.52 | 5.0 | 15.3 | 7.51 |
| Ex. 6 | 180 | 1.224 | 19.6 | 0.27 | 6.48 | 6.0 | 16.0 | 7.24 |
| Ex. 7 | 200 | 1.320 | 20.4 | 0.29 | 6.96 | 6.5 | 15.5 | 6.49 |
| Ex. 8 | 250 | 1.560 | 25.0 | 0.36 | 8.64 | 8.1 | 16.0 | 4.97 |
| Ex. 9 | 50 | 0.600 | 5.5 | 0.15 | 3.60 | 3.1 | 9.2 | 5.48 |
| Ex. 10 | 60 | 0.648 | 6.6 | 0.16 | 3.84 | 3.3 | 10.2 | 6.00 |

EFFECTS OF THE INVENTION

As shown in FIG. 1, the energy density varies depending upon the thickness of the electrode sheet made of a porous layer. This is because the energy density is determined by the capacitance density of the element and the resistance of the element. According to the present invention, it is possible to obtain an electric double layer capacitor which has a high energy density and little self discharge and which is excellent in charging and discharging cycle durability.

The electric double layer capacitor of the present invention has low resistance and high capacitance density. Therefore, making the capacitor have such a structure that a plurality of the positive electrode assemblies and the negative electrode assemblies are alternately laminated with a separator interposed therebetween, or strip positive electrode assemblies and negative electrode assemblies are wound with a separator interposed therebetween, the electric double layer capacitor can be used as a capacitor for power source of at least 100F, further, at least 1000 F.

What is claimed is:

1. An electric double layer capacitor comprising a positive electrode assembly and a negative electrode assembly, each electrode assembly having a porous layer comprising a carbonaceous powder and a fluorine-containing polymer formed on at least one side of an aluminum foil current collector, the positive electrode and the negative electrode being disposed so that the porous layer of the positive electrode assembly and the porous layer of the negative electrode assembly face each other with a separator interposed therebetween to form an element, the element being impregnated with a non-aqueous electrolyte and accommodated in a sealed container, wherein the thickness of the porous layer is from 80 to 200 µm, the thickness of the aluminum foil current collector is from 20 to 80 µm, the thickness of the separator is from 30 to 170 µm, and the density of the porous layer is from 0.50 to 0.80 g/cm$^3$, wherein the capacitor has such a structure that a plurality of the positive electrode assemblies and the negative electrode assemblies are alternately laminated with a separator interposed therebetween, or strip positive electrode assemblies and negative electrode assemblies are wound with a separator interposed therebetween.

2. The electric double layer capacitor according to claim 1, wherein the porosity of the separator is from 60 to 95%.

3. The electric double layer capacitor according to claim 1, wherein the fluorine-containing polymer is a polytetrafluoroethylene.

4. The electric double layer capacitor according to claim 1, wherein the resistance per unit area of the electrode assembly is from 3 to 9 Ω·cm$^2$ and the resistance per unit area of the separator is at most 2 Ω·cm$^2$.

5. The electric double layer capacitor according to claim 1, wherein the porous layer is made of a sheet formed by extruding a mixture comprising a carbonaceous powder, a fluorine-containing polymer and a processing aid by screw extrusion, followed by rolling.

6. The electric double layer capacitor according to claim 5, wherein the electrode assembly has the aluminum foil current collector and the sheet bonded thereto by means of an electroconductive adhesive.

7. The electric double layer capacitor according to claim 1, wherein the specific surface area of the carbonaceous powder is from 700 to 2500 m$^2$/g.

8. The electric double layer capacitor according to claim 1, wherein the fluorine-containing polymer is contained in the porous layer in an amount of from 5 to 20 wt %.

9. The electric double layer capacitor according to claim 1, wherein the non-aqueous electrolyte comprises an organic solvent and a salt comprising a quaternary onium cation represented by R$^1$R$^2$R$^3$R$^4$N$^+$ or R$^1$R$^2$R$^3$R$^4$P$^+$, wherein each of R$^1$, R$^2$, R$^3$ and R$^4$ which are the same or different, is a C$_{1-6}$ alkyl group, and an anion.

10. The electric double layer capacitor according to claim 9, wherein the anion is selected from the group consisting of BF$_4^-$, PF$_6^-$, ClO$_4^-$ and CF$_3$SO$_3^-$.

11. The electric double layer capacitor according tin claim 10, wherein the porosity of the separator is from 60 to 95%.

12. The electric double layer capacitor according to claim 10, wherein the fluorine-containing polymer is a polytetrafluoroethylene.

13. The electric double layer capacitor according to claim 10, wherein the resistance per unit area of the electrode assembly is from 3 to 9 Ω·cm$^2$ and the resistance per unit area of the separator is at most 2 Ω·cm$^2$.

14. The electric double layer capacitor according to claim 10, wherein the porous layer is made of a sheet formed by extruding a mixture comprising a carbonaceous powder, a fluorine-containing polymer and a processing aid by screw extrusion, followed by rolling rolls.

15. The electric double layer capacitor according to claim 14, wherein the electrode assembly has the aluminum foil current collector and the sheet bonded thereto by means of an electroconductive adhesive.

16. The electric double layer capacitor according to claim 10, wherein the specific surface area of the carbonaceous powder is from 700 to 2500 m$^2$/g.

17. The electric double layer capacitor according to claim 10, wherein the fluorine-containing polymer is contained in the porous layer in an amount of from 5 to 20 wt. %.

18. The electric double layer capacitor according to claim 10, wherein the non-aqueous electrolyte comprises an organic solvent and a salt comprising a quaternary onium cation represented by $R^1R^2R^3R^4N^+$ or $R^1R^2R^3R^4P^+$, wherein each of $R^1$, $R^2$, $R^3$ and $R^4$ which are the same or different, is a $C_{1-6}$ alkyl group, and an anion.

19. The electric double layer capacitor according to claim 18, wherein the anion is selected from the group consisting of $BF_4^-$, $PF_6^-$, $ClO_4^-$ and $CF_3SO_3^-$.

20. The electric double layer capacitor according to claim 1, wherein the thickness of the aluminum foil current collector is from 30 to 60 $\mu$m.

* * * * *